Patented Apr. 24, 1923.

1,452,605

UNITED STATES PATENT OFFICE.

LINDLEY M. HUSSEY, OF PHILADELPHIA, PENNSYLVANIA, ASSIGNOR TO JOSEPH PHILIP HARMER, OF PHILADELPHIA, PENNSYLVANIA.

ARSENICAL COMPOUND.

No Drawing. Application filed June 21, 1920, Serial No. 390,313. Renewed August 23, 1922. Serial No. 583,936.

*To all whom it may concern:*

Be it known that I, LINDLEY M. HUSSEY, a citizen of the United States, and resident of Philadelphia, in the county of Philadelphia and State of Pennsylvania, have invented certain new and useful Improvements in Arsenical Compounds, of which the following is a specification.

The invention relates to a new composition of matter in the form of an arsenical compound designed for biological, chemical, therapeutical and other uses where such compounds are of value and the invention also relates to a novel process for forming such composition.

It has been known in the arts to prepare monoethyl arsonic acid together with their magnesium and potassium salts but these chemicals have poisonous properties and are otherwise unsuited for use where a salt of the monoethyl arsonic acid is desired for therapeutic use such as in the treatment of trypanosomal and spirochætal infections.

The present invention has for an object the preparation of a new compound which is believed to be di-sodium monoethyl arsonate with the chemical constitution of

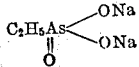

and which is characterized by properties having the desirable attributes of the salts of monoethyl arsonic acid without the deleterious properties characterizing the known salts of this acid when attempts have been made to utilize the same for therapeutical and other purposes.

Another object of the invention incidental to the process feature of the disclosure is to provide a simple, inexpensive, and commercially practical method for preparing the new compound economically and in a manner capable of use in a plant manufacturing the composition in large quantities.

Broadly, the process includes the step of treating an aqueous solution of a formed chemical substance containing both a single ethyl radical and an arsenic radical together with a sodium compound which contains a radical capable of combining with any other foreign radicals present in the substance to form a compound less soluble in water than the monoethyl arsonate of said foreign radicals, removing any precipitate which may form and evaporating the residue to dryness preferably under vacuum.

The substance is prepared by boiling a suspension of magnesium monoethyl arsonate in water with an aqueous solution of any compound of sodium which contains an anion or acid radical capable of combining with the magnesium kation to form a magnesium compound less soluble in water than magnesium monoethyl arsonate. One such sodium compound which has been used with satisfaction is sodium hydroxide, but sodium phosphate and sodium carbonate have been found to be equally efficacious and in the following description and claims, the specific identification of sodium hydroxide is, of course, to be considered as of sufficient breath to cover its chemical equivalents.

The insoluble magnesium compound formed is filtered out of the solution of disodium monoethyl arsonate and the latter salt is obtained in its dry form by evaporation to dryness in vacuo.

As one specific example of this method a suspension of 396 grams of magnesium ethyl arsonate in 500 cc. of distilled water is treated with a solution of 180 grams of sodium hydroxide in 450 cc. of distilled water. The mixture is digested until the uniform gelatinous appearance of the suspension of magnesium hydroxide shows the reaction is complete.

The resulting product is a white, deliquescent, crystalline salt, readily soluble in water and forming solutions which are stable unless brought into contact with the air. When in solution and exposed to the air, especially over long periods of time, the new product is believed to absorb carbon dioxide for it decomposes into sodium carbonate and ethyl arsonic acid.

In the powdered form disodiummonoethylarsonate is deliquescent in moist air. Its crystals are efflorescent in dry air, losing water of crystallization.

In these properties the new composition possesses an advantage over the known magnesium and potassium salts of monoethyl arsonic acid for it has the additional advantage in that it is not poisonous and is therefore available for use medicinally in ways not possible with the heretofore known salts.

Having thus described my invention, I claim:

1. A non-poisonous compound suitable for therapeutical uses and herein identified as di-sodium monoethyl arsonate, said compound characterized as a white deliquescent crystalline salt soluble in water forming substantially stable solutions, and which, when in solution and exposed to the air for a long period of time eventually decomposes into sodium carbonate and ethylarsonic acid.

2. In the art of preparing a new compound herein identified as di-sodium monethyl arsonate, the process which consists in boiling a suspension of magnesium monethyl arsonate in water with an aqueous solution of a compound which contains a radical capable of combining with the magnesium present to form a magnesium compound less soluble in water than magnesium monoethyl arsonate, removing the insoluble magnesium compound and evaporating the residue to dryness in vacuo.

3. The process which includes the step of boiling a suspension of magnesium monoethyl arsonate in water with an anion or acid sodium compound which contains a radical capable of combining with the magnesium to form a magnesium compound less soluble in water than magnesium monoethyl arsonate.

4. The process which includes the step of treating a suspension of magnesium monoethyl arsonate in water with a sodium compound which contains a radical capable of combining with the magnesium to form a magnesium compound less soluble in water than magnesium monoethyl arsonate and filtering off the magnesium compound as formed.

5. In the art of forming di-sodium monoethyl arsonate, the process which includes the steps of treating with sodium hydroxide, an aqueous solution of monoethyl arsonate filtering if necessary to remove any precipitates which may be formed, and evaporating the residue to dryness under vacuo.

6. In the art of forming di-sodium monoethyl arsonate, the process which consists in boiling a solution of a substance having a formula of the type of

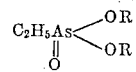

in which R is an element of the type of magnesium, with a sodium salt of the type in which the sodium radical is capable of replacing the R element in the substance.

7. In the art of forming a salt of monoethyl arsonic acid from a salt of the acid having a base radical less positive electrochemically than the base radical of the desired salt, the process which consists in associating the salts while in aqueous solutions and in the presence of heat, filtering off any precipitates formed and evaporating the residue.

8. In the art of preparing a medicinally pure form of di-sodium monoethyl arsonate, the process which includes the steps of boiling magnesium monoethyl arsonate with sodium hydroxide, filtering off the insoluble magnesium compound formed and evaporating the solution to dryness.

9. The process which includes the step of treating a suspension of approximately 396 grams of magnesium ethyl arsonate in 500 cc. of water with a solution of approximately 180 grams of sodium hydroxide in 450 cc. of water, digesting the mixture until a gelatinous body of magnesium hydroxide is formed.

Signed at Philadelphia in the county of Philadelphia, and State of Pennsylvania this 22nd day of May A. D. 1920.

LINDLEY M. HUSSEY.